United States Patent
Asayama et al.

(10) Patent No.: US 7,970,155 B2
(45) Date of Patent: Jun. 28, 2011

(54) VIDEO/AUDIO OUTPUT DEVICE AND EXTERNAL SPEAKER CONTROL APPARATUS

(75) Inventors: Sako Asayama, Nara (JP); Hiroshi Kase, Osaka (JP); Mitsuteru Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/911,697

(22) PCT Filed: Sep. 21, 2006

(86) PCT No.: PCT/JP2006/318698
§ 371 (c)(1),
(2), (4) Date: Oct. 16, 2007

(87) PCT Pub. No.: WO2007/040053
PCT Pub. Date: Apr. 12, 2007

(65) Prior Publication Data
US 2009/0051825 A1 Feb. 26, 2009

(30) Foreign Application Priority Data
Sep. 30, 2005 (JP) ................. 2005-289093

(51) Int. Cl.
*H02B 1/00* (2006.01)
*H04R 29/00* (2006.01)
(52) U.S. Cl. .......................... 381/123; 381/58
(58) Field of Classification Search ........... 381/123, 381/56, 58, 77, 79–81; 348/552
See application file for complete search history.

(56) References Cited

U.S. PATENT DOCUMENTS

| 6,034,737 | A | 3/2000 | Koyama et al. |
| 7,212,253 | B1 | 5/2007 | de Groot et al. |
| 7,720,238 | B2 * | 5/2010 | Tomita .......................... 381/107 |
| 2003/0185400 | A1 | 10/2003 | Yoshizawa et al. |
| 2004/0073321 | A1 | 4/2004 | Kondo |

(Continued)

FOREIGN PATENT DOCUMENTS

EP 1 324 604 7/2003

(Continued)

OTHER PUBLICATIONS

Supplementary European Search Report issued Jun. 25, 2010 in corresponding European Patent Application No. 06 79 8190.

(Continued)

Primary Examiner — Xu Mei
(74) Attorney, Agent, or Firm — Wenderoth, Lind & Ponack, L.L.P.

(57) ABSTRACT

An external speaker control apparatus causes only one of an internal speaker and an external speaker to output audio when a power supply of the external speaker control apparatus which controls the external speaker changes from an off state to an on state, the external speaker being a speaker outside a video and audio output apparatus. The external speaker control apparatus includes a microcomputer for detecting the change of the power supply of an amplifier from an off state to an on state and a HDMI/CEC communication unit or outputting an instruction requesting output of information which indicates the audio output mode to the video and audio output apparatus while at the same time receiving the information indicating the audio detects the change of the power supply from an off state to an on state, wherein the microcomputer controls the output of the audio from the external speaker according to the information indicating the audio output mode.

10 Claims, 5 Drawing Sheets

U.S. PATENT DOCUMENTS

| | | |
|---|---|---|
| 2004/0181301 A1 | 9/2004 | Kimura et al. |
| 2005/0111675 A1* | 5/2005 | Lee .............................. 381/104 |
| 2005/0190928 A1 | 9/2005 | Noto |
| 2009/0046210 A1* | 2/2009 | Sakamoto et al. ............ 348/738 |

FOREIGN PATENT DOCUMENTS

| | | |
|---|---|---|
| JP | 63-102571 | 5/1988 |
| JP | 5-153520 | 6/1993 |
| JP | 5-161091 | 6/1993 |
| JP | 10-079896 | 3/1998 |
| JP | 11-275684 | 10/1999 |
| JP | 2003-179821 | 6/2003 |
| JP | 2003-298975 | 10/2003 |
| JP | 2004-007389 | 1/2004 |
| JP | 2004-282138 | 10/2004 |
| WO | 00/72589 | 11/2000 |
| WO | 2006-057324 | 6/2006 |

OTHER PUBLICATIONS

"High Definition Multimedia Interface Specification, Informational Version 1.0," Sep. 4, 2003.

"The HAVi Specification. Version 1.1—Chapter 6: APIs for Functional Component Modules," May 15, 2001.

International Search Report issued Nov. 14, 2006 in the International (PCT) Application of which the present application is the U.S. National Stage.

* cited by examiner

VIDEO/AUDIO OUTPUT DEVICE AND EXTERNAL SPEAKER CONTROL APPARATUS

BACKGROUND

The present invention relates to a video/audio output device for outputting video and audio to an external speaker control apparatus which controls a speaker outside the video/audio output device.

In recent years, users are able to enjoy ambient audio, known generally as surround sound, by connecting an AV amplifier in between a plurality of speakers and a video/audio output device such as a TV, and outputting, from the plurality of the speakers connected to the AV amplifier, the audio of broadcast contents received by a TV tuner or a set top box (STB), or the audio of video contents reproduced by a DVD player/DVD recorder.

A user intending to output surround sound turns off (mutes) the audio outputted from the speaker (internal speaker) of the TV by operating the remote control button or the main button of the TV, and then, by operating a remote control button or the main button of the AV amplifier, causes input audio from the device, which is outputting the contents displayed by the TV, to be outputted from a speaker (external speaker) connected to the AV amplifier. In the process, the user is required first to operate the remote control button or a button on the console and then to operate a remote control button of the AV amplifier or a button on the AV amplifier. Since these operations must be performed for plural devices, the apparatuses above are not user-friendly.

In order to solve this problem, and to simplify the TV and AV amplifier operations when outputting the audio from the speaker (external speaker) connected to the AV amplifier, AV amplifiers have been realized in which an audio output source is switched by the on/off operation of the power supply switch on the AV amplifier.

Japanese Patent Laid-Open No. 5-153520 bulletin, for example, discloses an AV amplifier which can make up a surround system in combination with a TV receiver and which greatly facilitates the switching operation between use of the surround system and use of the TV receiver alone.

FIG. 1 is a block diagram showing the AV amplifier disclosed in Japanese Patent Laid-Open No. 5-153520.

In FIG. 1, when the surround system is used, a power supply switch 41 of the AV amplifier 40 is turned on, a change-over switch 50 is switched to a center audio amplifier circuit 48 side, and the audio signal supplied to an audio input terminal 43 from the reproduction device, such as a VTR or an LD, is supplied to the speaker connected to the AV amplifier 40 through a Dolby surround processor (DSP) 45 and an output terminal 49. When using the TV receiver alone, on the other hand, the power supply switch 41 of the AV amplifier 40 is turned off, the change-over switch 50 is turned to a TV audio input terminal 51 side, so that the TV audio processed in the amplifier circuit of the TV receiver is supplied to the speaker (internal speaker) of the TV receiver.

In the method disclosed Japanese Patent Laid-Open No. 5-153520, as described above, the audio is outputted from the speaker (internal speaker) built into the TV or the audio is outputted from the speaker (external speaker) outside the TV by switching the power supply switch of the AV amplifier between an on state and an off state.

Even when the power supply switch of the AV amplifier is turned from an off state to an on state, some TV receivers still output the audio from the internal speaker if the TV power supply is turned on after such change is made. In this case, the audio is outputted from both the internal and external speakers. Also, in the case where the user directly operates the TV or the AV amplifier, the audio can be set so as to not be outputted from the internal or the external speaker. The user desires that the audio is outputted from only one of the internal and external speakers.

SUMMARY

An aspect of the invention is to provide a video/audio output device and an external speaker control apparatus for outputting the audio from only one of the internal and external speakers when the power supply for the external speaker control apparatus that controls the external speaker, i.e. a speaker outside the video/audio output device, changes from an off state to an on state.

Another aspect of the invention is to provide a video/audio output device for outputting the audio from only one of the internal and external speakers when the power supply for the video/audio output device changes from an off state to an on state.

In order to solve the aforementioned problem and achieve the aforementioned aspects, a video and audio output apparatus is provided according to an aspect of the invention, for outputting video and audio, including an internal speaker which outputs the audio, a holding unit which holds information, an accepting unit which accepts an instruction from outside the video and audio output apparatus, a management unit which causes the holding unit to hold information which indicates any one of a plurality of audio output modes based on a mode-specifying instruction for specifying the output mode of the audio accepted by the accepting unit, a receiving unit which receives an instruction from an external speaker control apparatus for controlling the external speaker which is a speaker outside the video and audio output apparatus, and an output unit which outputs the information indicating the audio output mode held in the holding unit to the external speaker control apparatus in the case when the receiving unit receives an instruction requesting output of the information indicating the audio output mode from the external speaker control apparatus.

According to an aspect of the invention, there is provided an external speaker control apparatus for controlling the external speaker constituting a speaker outside the video and audio output apparatus, comprising a detection unit which detects the change of the power supply of the external speaker control apparatus from an off state to an on state, an output unit which outputs an instruction requesting the output of the information indicating the audio output mode to the video and audio output apparatus in the case where the detection unit detects the change of the power supply from an off state to an on state, a receiving unit which receives the information from the video and audio output unit, and a control unit which controls the output of the audio from the external speaker based on the information indicating the audio output mode received by the receiving unit.

As described above, when the power supply changes from an off state to an on state, the external speaker control apparatus according to an aspect of the invention outputs an instruction requesting the output of the information indicating the audio output mode to the video and audio output apparatus, receives the information indicating the audio output mode from the video and audio output apparatus, and based on this information, controls the audio outputted from the external speaker. As a result, the audio is output only from one of the internal and external speakers.

In the video and audio output apparatus according to an aspect of the invention, the management unit, for example, causes the holding unit to hold, based on the mode-specifying instruction, one of (a) the information indicating a first audio output mode for causing the internal speaker to output the audio and (b) the information indicating a second audio output mode for causing the external speaker to output the audio.

The video and audio output apparatus according to an aspect of the invention may further include a control unit which (a) causes the internal speaker to output the audio in the case where the information indicating the first audio output mode for causing the internal speaker to output the audio is held in the holding unit, and which (b) causes the internal speaker not to output the audio in the case where the information indicating the second audio output mode for causing the external speaker to output the audio is held in the holding unit.

Also, in the external speaker control apparatus according to an aspect of the invention, the control unit, for example, (a) causes the external speaker not to output the audio in the case where the receiving unit receives the information indicating the first audio output mode for outputting the audio from the internal speaker of the video and audio output apparatus and (b) causes the external speaker to output the audio in the case where the receiving unit receives the information indicating the second audio output mode for outputting the audio from the external speaker.

Also, according to an aspect of the invention, there is provided a video and audio output apparatus for outputting the video and the audio, including an internal speaker for outputting the audio, a holding unit which holds the information, an accepting unit which accepts an instruction from outside the video and audio output apparatus, a management unit which causes the holding unit to hold the information indicating any one of a plurality of audio output modes based on a mode-specifying instruction for specifying the audio output mode accepted by the accepting unit, a control unit which controls the audio outputted from the internal speaker based on the information indicating the audio output mode held in the holding unit, a detection unit which detects the change of the power supply of the video and audio output apparatus from an off state to an on state, and an output unit which outputs the information indicating the audio output mode held in the holding unit to the external speaker control apparatus which controls the speaker outside the video and audio output apparatus in the case where the detection unit detects the change of the power supply from an off state to an on state.

An aspect of the invention can be realized as a method including, as steps, the unique configuration means of the video and audio output apparatus according to an aspect of the invention, can be realized as a program with these steps executed by a computer or can be realized as an integrated circuit including the unique configuration means described above. Also, an aspect of the invention can be realized as a method including, as steps, the unique configuration units of the external speaker control apparatus according to an aspect of the invention or can be realized as an integrated circuit including the unique configuration units described above. The program described above can be distributed through a recording medium such as CD-ROM or a transmission medium such as a communication network.

The invention can provide a video and audio output apparatus and an external speaker control apparatus for outputting audio from only one of the internal speaker and the external speaker when the power supply of the external speaker control apparatus for controlling the external speaker constituting a speaker outside the video and audio output apparatus changes from an off state to an on state.

According to an aspect of the invention, the audio output state of the video and audio output apparatus and the external speaker control apparatus can be switched simply by operating the video and audio output apparatus. Therefore, an operation for switching the audio output state can be simplified and usability can be improved.

Also, the audio output state can be restored to a desired state even when the audio is outputted from both the video and audio output apparatus and the external speaker control apparatus, or when both are muted. Therefore, the operation of switching the audio output state can be simplified, and usability can be improved.

Also, an aspect of the invention can provide a video and audio output apparatus for outputting the audio from either only the internal speaker or only the external speakers when the power supply of the video and audio output apparatus turns from an off state to an on state.

NUMERICAL REFERENCES

Figure 1:
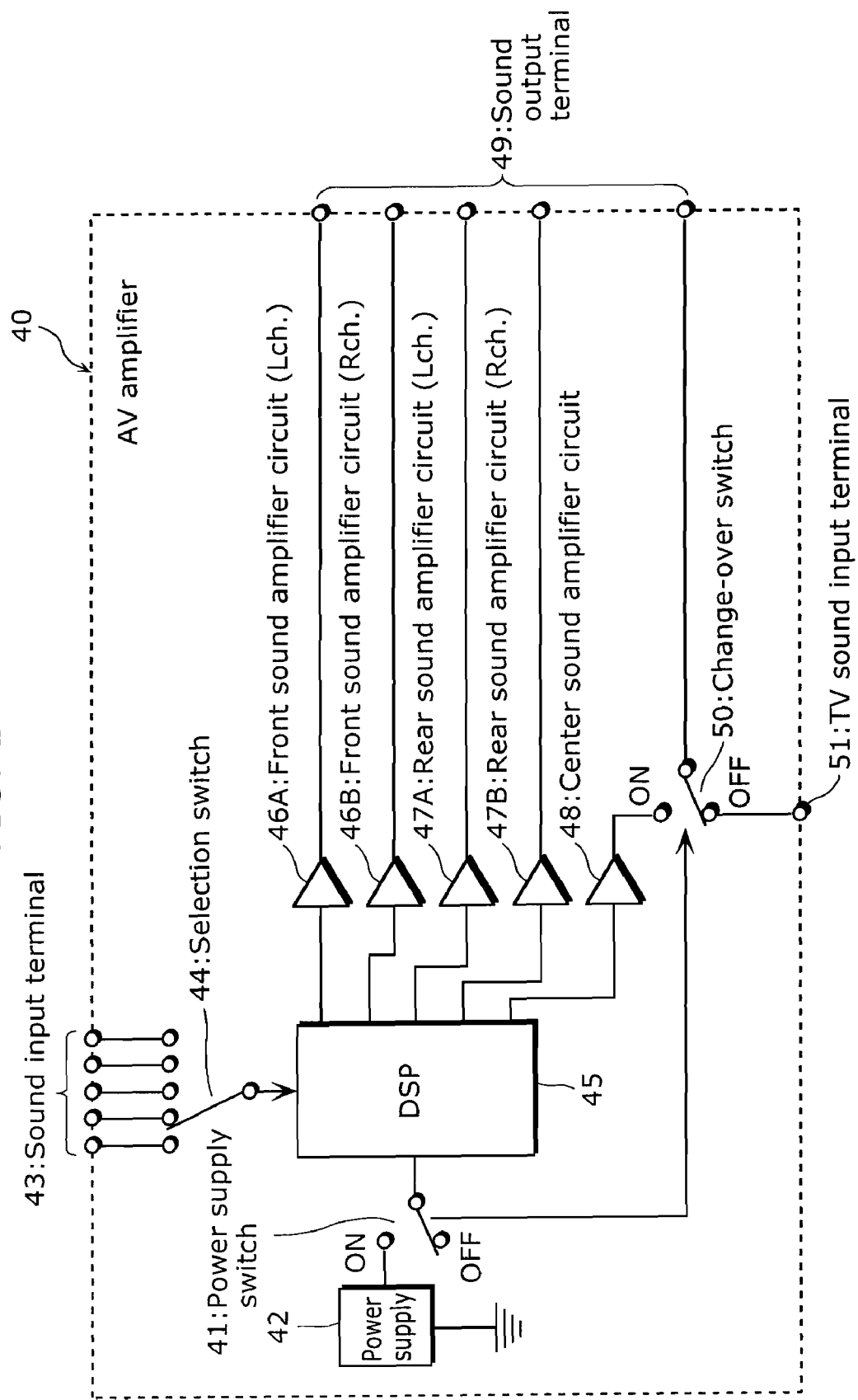
FIG. 1 is a block diagram showing an AV amplifier which constitutes the background art to the invention.

1 TV
2 Amplifier
3 External speaker
101 Memory
102 Remote control receiving unit
103 Microcomputer
104 HDMI/CEC communication unit
105 Tuner
106 Decoder
107 Display
108 Internal speaker
109 External output unit
110 Mode flag
201 HDMI/CEC communication unit
202 Microcomputer
203 HDMI/CEC communication unit
204 Selector
205 External signal input unit
206 Speaker output unit

DETAILED DESCRIPTION

The embodiments of the invention are explained below with reference to the drawings.

Figure 2:
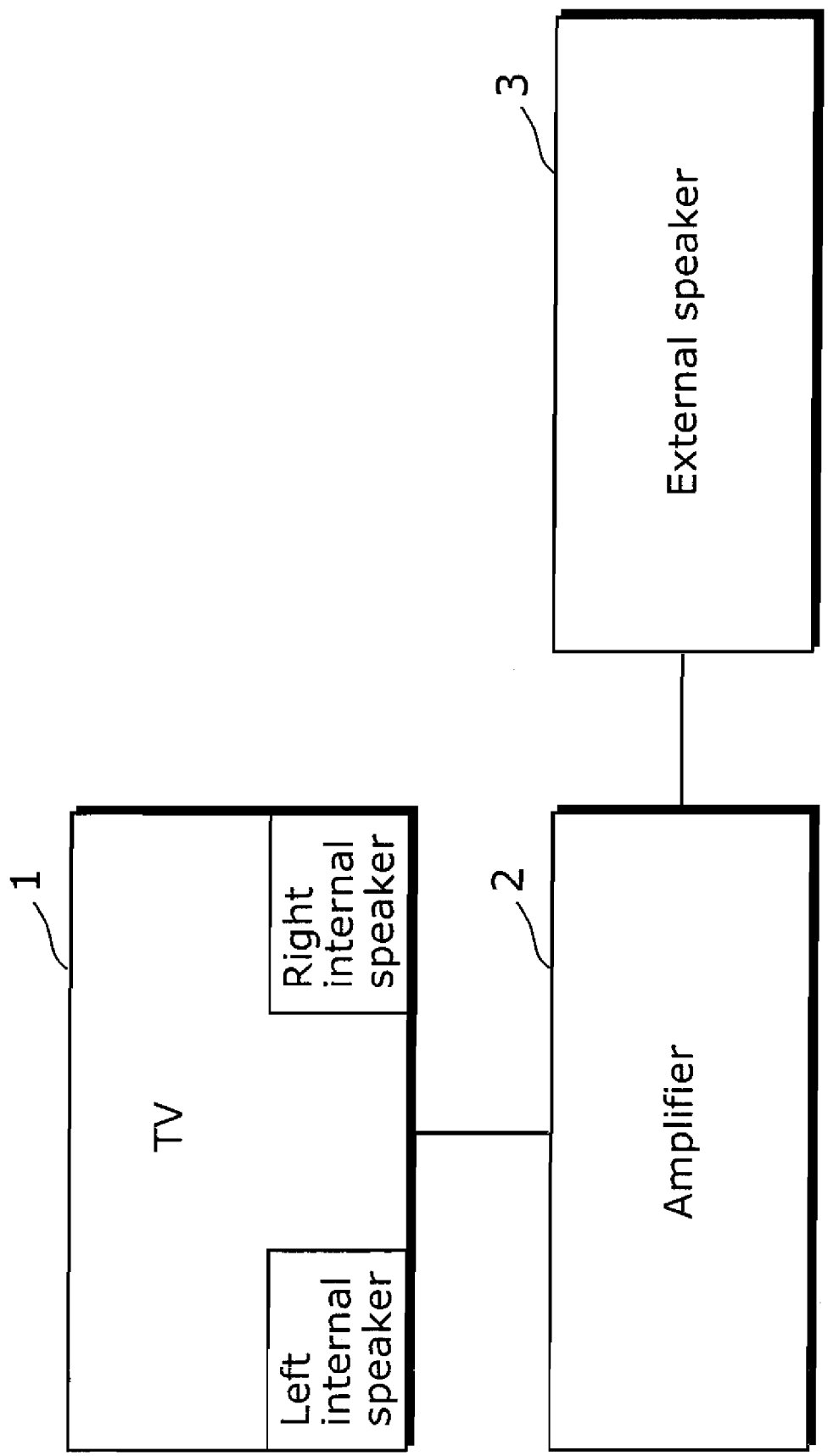
FIG. 2 is a diagram showing a configuration of a system according to the embodiments.

FIG. 2 is a diagram showing a configuration of the system according to the embodiments. The system according to an aspect of the invention is configured of a TV 1, an amplifier 2 and an external speaker 3. The TV 1 is a device for receiving the broadcast wave and outputting the video and the audio, and is an example of the video/audio output device according to an aspect of the invention. The amplifier 2 is a device for amplifying the signal inputted from the TV 1 and outputting the signal to the external speaker 3, and is an example of the external speaker control apparatus according to an aspect of the invention. The external speaker 3 is a device for outputting the audio based on the audio signal from the amplifier 2.

The TV 1 and the amplifier 2 are connected to each other by a high-definition multimedia interface (HDMI) cable, and the video and audio signals outputted from the amplifier 2 are inputted into the TV 1.

Further, the TV 1 and the amplifier 2 are connected to each other by an optical cable, and the audio signal outputted from the TV 1 is inputted into the amplifier 2.

Also, the TV 1 and the amplifier 2 connected to each other by the HDMI cable can exchange a consumer electronics control (CEC) command with each other through a CEC.

Figure 3:
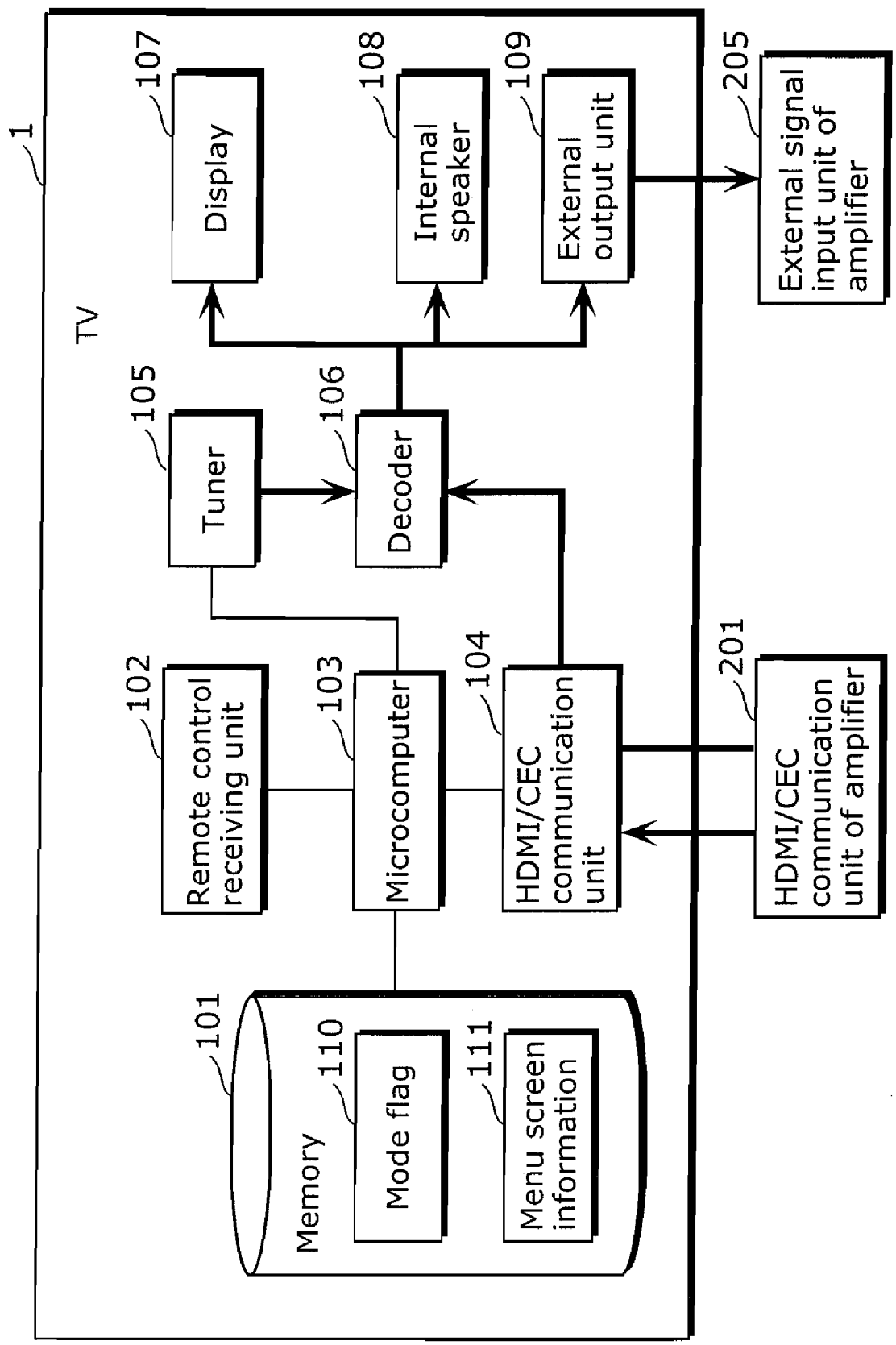
FIG. 3 is a block diagram showing a configuration of a TV 1 according to the embodiments.

FIG. 3 is a block diagram showing a configuration of the TV 1 according to the embodiments.

As shown in FIG. 3, the TV 1 is configured of a memory 101, a remote control receiving unit 102, a microcomputer 103, an HDMI/CEC communication unit 104, a tuner 105, a decoder 106, a display 107, an internal speaker 108 and an external output unit 109. A mode flag 110 is stored in the memory 101.

The TV 1 is operated by a remote control (hereinafter referred to as the "TV remote control").

When the remote control receiving unit 102 receives a command from a TV remote controller (not shown), the microcomputer 103 executes the process corresponding to the received command. For example, the microcomputer 103 switches the channel of the tuner 105 and the input and output of the decoder 106. The decoder 106, in response to the instruction of the microcomputer 103, outputs the video and audio signals inputted from the tuner 105 and the HDMI/CEC communication unit 104 to the display 107 and the internal speaker 108 or the external output unit 109.

The memory 101 is an example of the holding unit of the video/audio output device according to an aspect of the invention, and the remote control receiving unit 102 is an example of the accepting unit of the video/audio output device according to an aspect of the invention. The microcomputer 103 is an example of the management unit and of the control unit in the video/audio output device according to an aspect of the invention, and the HDMI/CEC communication unit 104 is an example of a receiving unit and an output unit of the video/audio output device according to an aspect of the invention.

Figure 4:
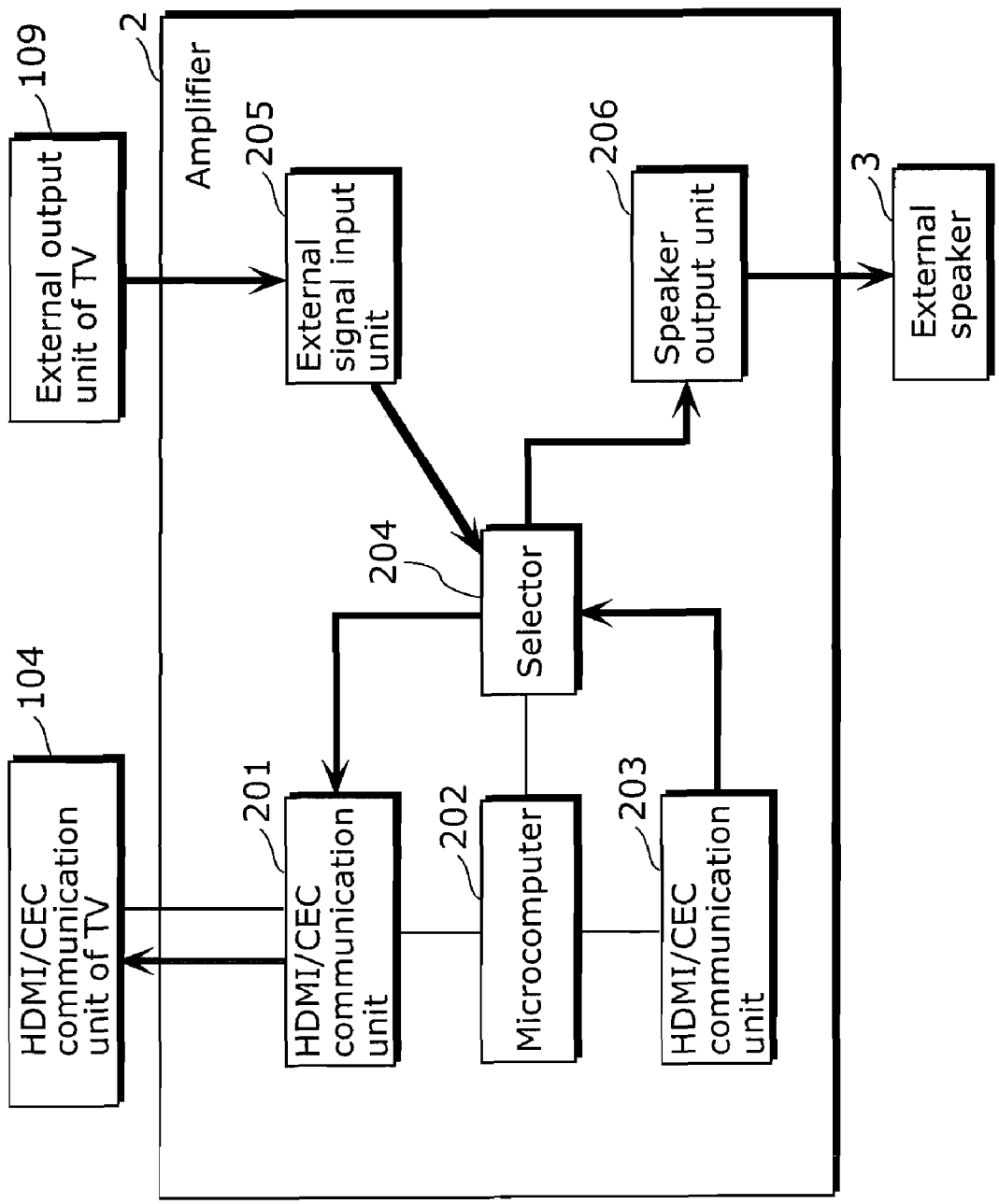
FIG. 4 is a block diagram showing a configuration of an amplifier 2 according to the embodiments.

FIG. 4 is a block diagram showing a configuration of the amplifier 2 according to the embodiments.

As shown in FIG. 4, the amplifier 2 is composed of an HDMI/CEC communication unit 201, a microcomputer 202, an HDMI/CEC communication unit 203, a selector 204, an external signal input unit 205 and a speaker output unit 206.

The microcomputer 202 executes the process corresponding to the CEC command received by the HDMI/CEC communication unit 201 or the HDMI/CEC communication unit 203. For example, the microcomputer 202 switches the input/output of the selector 204. The selector 204 outputs the video and audio signals inputted from the HDMI/CEC communication unit 203, as well as the audio signal inputted from the external signal input unit 205 to the HDMI/CEC communication unit 201 or the speaker output unit 206 according to an instruction from the microcomputer 202.

The microcomputer 202 is an example of the detection unit and the control unit of the external speaker control apparatus according to an aspect of the invention, and the HDMI/CEC communication unit 201 is an example of the output unit and the receiving unit of the external speaker control apparatus according to an aspect of the invention.

In the system shown in FIG. 2, the external speaker 3 is connected by a speaker cable to the speaker output unit 206 in FIG. 4. Also, the HDMI/CEC communication unit 201 in FIG. 4 is connected to the HDMI/CEC communication unit 104 in FIG. 3 by the HDMI cable. The external signal input unit 205 in FIG. 4 is connected by an optical cable to the external output unit 109 in FIG. 3.

Figure 5:
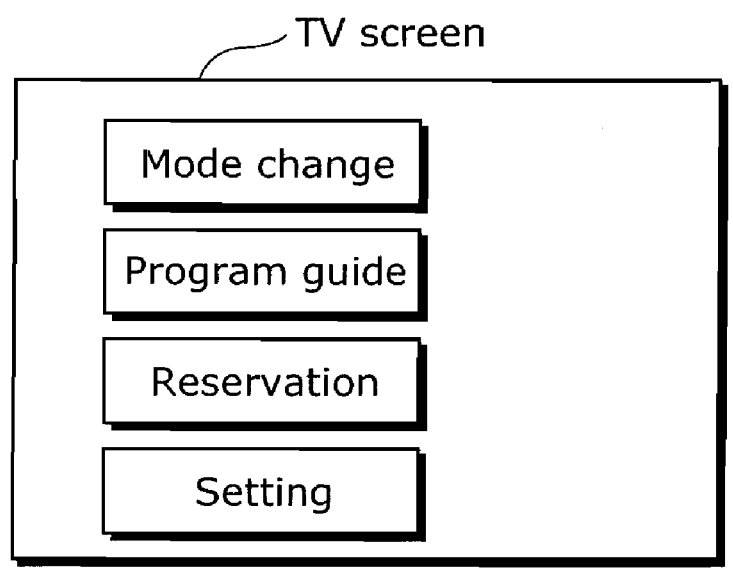
FIG. 5 is a diagram showing a menu screen displayed on the TV 1 according to the embodiments.

FIG. 5 is a diagram showing the menu screen displayed on the TV 1 according to the embodiment.

As shown in FIG. 5, items that are selectable by the user and which the user can cause to be performed by the TV 1 after being selected are displayed on the menu screen. Items capable of being switched between TV mode and theater mode (items with the name "mode change" in FIG. 5) by user selection are displayed on the menu screen.

(Definition of Mode)

The TV mode and the theater mode managed by the microcomputer 103 of the TV 1 are explained below. According to this embodiment, "TV mode" is defined as the state in which the muted state of the audio outputted from the internal speaker 108 of the TV 1 is canceled and the audio outputted from the external speaker 3, which is connected to the amplifier 2, is muted. In contrast, a state in which the audio outputted from the internal speaker 108 of the TV 1 is muted and the muted state of audio outputted from the external speaker 3, which is connected to the amplifier 2, is canceled is defined as "theater mode".

(Mode Change/Switching from TV Mode to Theater Mode)

The flow of the process for switching the mode flag 110 stored in the memory 101 of the TV 1 from TV mode to theater mode is explained below.

When the mode flag 110 stored in the memory 101 indicates the TV mode, the microcomputer 103 outputs the video signal received by the tuner 105 to the display 107, and outputs the audio signal received by the tuner 105 to the internal speaker 108 and the external output unit 109. Thus audio is outputted from the internal speaker 108 of the TV 1.

Also, the amplifier 2 mutes the audio signal, which is inputted from the external signal input unit 205 connected with the external output unit 109 of the TV 1 and outputted to the speaker output unit 206. Thus no audio is outputted from the external speaker 3 connected to the amplifier 2.

In this state, the user displays the menu held by the memory 101 on the display 107 of the TV 1 using the TV remote control or the like and selects a menu item ("mode change") for changing the mode flag 110 recorded in the memory 101 of the TV 1. The microcomputer 103 of the TV 1 analyzes the selected menu item and changes the mode flag 110 recorded in the memory 101. Specifically, the microcomputer 103 changes the mode flag 110 recorded in the memory 101 from TV mode to theater mode.

Next, the microcomputer 103 instructs the decoder 106 to mute the audio from the internal speaker 108.

The decoder 106, in response to the instruction from the microcomputer 103 to mute the audio of the internal speaker 108, mutes the audio from the internal speaker 108.

As a result, audio is no longer outputted from the internal speaker 108 of the TV 1.

Also, the microcomputer 103 transmits, to the amplifier 2 through the HDMI/CEC communication unit 104, the CEC command indicating that the mode flag 110 recorded in the memory 101 of the TV 1 has been changed from the TV mode to the theater mode.

In the amplifier 2, the HDMI/CEC communication unit 201 connected with the HDMI/CEC communication unit 104 of the TV 1 receives the CEC command from the TV 1.

The microcomputer 202 analyzes the CEC command received by the HDMI/CEC communication unit 201, the CEC command being a command indicating that the mode flag 110 recorded in the memory 101 of the TV 1 has been changed from TV mode to theater mode, instructs the selector 204 to output the audio signal inputted from the external signal input unit 205 to the speaker output unit 206.

The selector 204, upon receipt of the instruction from the microcomputer 202 to output the audio signal inputted from the external signal input unit 205 to the speaker output unit 206, outputs the audio signal to the speaker output unit 206.

Thus the audio is outputted from the external speaker 3.

(Mode Change/Switching from Theater Mode to TV Mode)

Next, the flow of the process for switching the mode flag 110 stored in the memory 101 of the TV 1 from theater mode to TV mode is explained below.

When the mode flag 110 stored in the memory 101 indicates the theater mode, the microcomputer 103 outputs the video signal received by the tuner 105 to the display 107, and without outputting the audio based on the audio signal received by the tuner 105 from the internal speaker 108, outputs the received audio signal to the external output unit 109. Thus no audio is outputted from the internal speaker 108 of the TV 1.

Also, the amplifier 2 outputs the audio signal which is inputted from the external signal input unit 205 connected with the external output unit 109 of the TV 1, and outputted to the speaker output unit 206. Thus, the audio is outputted from the external speaker 3 connected to the amplifier 2.

Under this condition, the menu held by the memory 101 is displayed on the display 107 of the TV 1 by use of the TV remote control or the like and a menu item ("mode change") for changing the mode flag 110 recorded in the memory 101 of the TV 1 is selected. The microcomputer 103 of the TV 1 analyzes the selected menu item, and changes the mode flag 110 recorded in the memory 101. In other words, the microcomputer 103 changes the mode flag 110 recorded in the memory 101 from theater mode to TV mode.

Next, the microcomputer 103 instructs the decoder 106 to output the audio from the internal speaker 108, which has not yet outputted the audio.

The decoder 106 causes the microcomputer 103 to output the audio from the internal speaker 108 which has not yet output the audio.

Thus, the audio is outputted from the internal speaker 108 of the TV 1.

Also, the microcomputer 103 transmits, to the amplifier 2 through the HDMI/CEC communication unit 104, the CEC command indicating that the mode flag 110 recorded in the memory 101 of the TV 1 has been changed from TV mode to theater mode.

In the amplifier 2, the HDMI/CEC communication unit 201 connected with the HDMI/CEC communication unit 104 of the TV 1 receives the CEC command from the TV 1.

The microcomputer 202 analyzes the CEC command received by the HDMI/CEC communication unit 201, the CEC command being a command indicating that the mode flag 110 recorded in the memory 101 of the TV 1 has been changed from theater mode to TV mode, and instructs the selector 204 not to output the audio based on the audio signal inputted from the external signal input unit 205 and outputted from the speaker output unit 206.

The selector 204, upon receipt of an instruction from the microcomputer 202 not to output the audio signal, which is inputted from the external signal input unit 205, to the speaker output unit 206, prevents output of the audio signal from the speaker output unit 206.

Thus, the audio ceases to be outputted from the external speaker 3.

Next, a method is explained below for recovering to a state in which the audio is outputted from only a speaker desired by the user, both when the audio is outputted from the internal speaker 108 and the external speaker 3 of the TV 1, or conversely, when the audio is outputted from neither the internal speaker 108 nor the external speaker 3, due to the fact that the power supply of the TV 1 and/or the amplifier 2 is turned on again after being muted or the user has performed an erroneous operation using a button on the console 1, a remote control button for the TV 1 and/or the amplifier 2.

First Embodiment

In the first embodiment, a flow of processes in the system shown in FIG. 2 is explained for changing the output state of the audio outputted from the external speaker 3 given that the amplifier 2 is configured to output the audio from the external speaker 3 immediately after power of the amplifier 2 is inputted for when the user mutes the power supply using the main button or the remote control button of the amplifier 2 and then turns on the power supply, or when the power supplied to the amplifier 2 is cut off for some reason and after that, the power supply is resumed and the power supply of the amplifier 2 is turned on again, or the power supply of the amplifier 2 is muted for other reasons and after that, the power supply of the amplifier 2 is turned on again.

First, the microcomputer 202 of the amplifier 2 detects that the power supply is changed from an off state to an on state when the power supply is switched on, and, through the HDMI/CEC communication unit 201, transmits a CEC command requesting the TV 1, connected with the amplifier 2, to give notification of information indicating whether the mode flag 110 recorded in the memory 101 of the TV 1 is in the TV mode or the theater mode.

Upon receipt of the CEC command by the HDMI/CEC communication unit 104 from the HDMI/CEC communication unit 201 of the amplifier 2, requesting notification of the mode information indicated by the mode flag 110, which is recorded in the memory 101, the microcomputer 103 in the TV 1 transmits the CEC command, carrying the mode information indicated by the mode flag 110 recorded in the memory 101, to the amplifier 2 through the HDMI/CEC communication unit 104.

The microcomputer 202 of the amplifier 2 analyzes the CEC command received by the HDMI/CEC communication unit 201, and when the mode flag 110 indicates the TV mode, instructs the selector 204 not to output the audio signal that has thus far been inputted from the external signal input unit 205 and outputted from the speaker output unit 206.

The selector 204, upon receipt of the instruction from the microcomputer 202 not to output the audio signal inputted from the external signal input unit 205 to the speaker output unit 206, ceases to output the audio signal to the speaker output unit 206.

Thus the audio ceases to be outputted from the external speaker 3.

In the case where the mode flag 110 indicates the theater mode, the microcomputer 202 of the amplifier 2 instructs the selector 204 to output the audio signal that has been inputted from the external signal input unit 205 and outputted from the speaker output unit 206.

In this case, audio is outputted from the external speaker 3 and therefore the audio output state remains unchanged.

In this way, according to the first embodiment, by checking the output format of the audio according to the mode flag 110 recorded in the TV 1 immediately after switching on the power of the amplifier 2, the amplifier 2 can prevent the audio of both the internal speaker 108 and the external speaker 3 of the TV 1 from being muted or prevent the audio from being outputted from both the internal speaker 108 and the external speaker 3 if required, by changing the output state of the audio.

Second Embodiment

In the second embodiment, a flow of processes is explained for changing the output state of the audio outputted from the internal speaker 108 given that the TV 1 is configured to output the audio from the internal speaker 108 immediately after switching on the power of the TV 1, when the user mutes the power supply using the main button or the remote control button of the TV 1 and after that, turns on the power supply again, or when the power supplied to the TV 1 is cut off for some reason and after that, the power supply is resumed and the power supply of the TV 1 is turned on, or when the power supply of the TV 1 is muted for some other reason and subsequently, the power supply of the TV 1 is turned on again.

First, the microcomputer 103 of the TV 1 detects that the power supply has changed from an off state to an on state when the power is switched on, and analyzes the mode flag 110 recorded in the memory 101. Note that the microcomputer 103 is also an example of the detection unit of the video/audio output device according to an aspect of the invention.

When the mode flag 110 analyzed indicates the TV mode, the microcomputer 103 instructs the decoder 106 to output the audio from the internal speaker 108.

The decoder 106, upon receipt of the instruction from the microcomputer 103 to output the audio from the internal speaker 108, causes the internal speaker 108 to output the audio. Thus the audio is outputted from the internal speaker 108 of the TV 1.

In this case, the audio has already been outputted from the internal speaker 108, and therefore the audio output state of the TV 1 remains unchanged.

When the analyzed mode flag 110 indicates the theater mode, the microcomputer 103 instructs the decoder 106 not to output the audio from the internal speaker 108.

The decoder 106, upon receipt of the instruction from the microcomputer 103 not to output the audio from the internal speaker 108, mutes the audio from the internal speaker 108.

Thus, no audio is outputted from the internal speaker 108 of the TV 1.

In this way, according to the second embodiment, the TV 1, immediately after its power is switched on, confirms the audio output state according to the mode flag 110 stored in the memory 101, and changes it, if required. As a result, a situation in which the audio of both the internal speaker 108 and the external speaker 3 of the TV 1 are muted, or the audio is outputted from both speakers, can be prevented.

Note that the first and second embodiments refer to the case in which the power supply of the amplifier 2 is switched on and the case in which the power supply of the TV 1 is switched on. When the power supplies of the TV 1 and the amplifier 2 are switched on at the same time, the TV 1 first confirms the state of the audio outputted from the internal speaker 108 based on the mode flag 110 recorded in the memory 101, and changes the state of the audio if required.

Then, the amplifier 2 confirms and if required, changes the state of the audio outputted from the external speaker 3 based on the mode flag 110 received from the TV 1. As a result, when the power supplies of both the TV 1 and the amplifier 2 are switched on at the same time and the audio is outputted from both speakers, also, the state before switching off the power of the TV 1 and the amplifier 2 can be easily recovered by changing a main state of the audio based on the mode flag 110 recorded in the TV 1.

Also, according to the first and second embodiments, when the power for the TV 1 and the amplifier 2 is switched on, the TV 1 and the amplifier 2 confirm and if required, change their audio output states according to the mode recorded in the memory of the TV 1. Nevertheless, in addition to the time when power is switched on, the TV 1 and the amplifier 2 may confirm and if required, change their audio output states according to the mode recorded in the memory 101 of the TV 1 at an appropriate timing, without regard to the time when the power is switched on, when their audio output states are changed for some reason or by a user operation.

As a result, without assuming that the audio is not outputted from the internal speaker 108 and the external speaker 3 of the TV 1, even in the case where the user performs an operation of changing the audio output state without changing the mode, i.e. an operation of turning off the audio or canceling the mute state using the console button or the remote control button of the TV 1 and/or the amplifier 2, or especially, even in the case where the user performs an operation to mute the audio from the device from which the audio is output and the audio is muted from both the internal speaker 108 and the external speaker 3 of the TV 1 in such a way that the audio ceases to be outputted from both the internal speaker 108 and the external speaker 3 of the TV 1, then the user can easily restore the TV mode or the theater mode by confirming and if required, changing the audio output state according to the mode stored in the memory 101 of the TV 1.

Also, the user may perform an operation, using the main button or the remote control button of the TV 1 and/or the amplifier 2, to prevent a state in which the audio is outputted from neither the internal speaker 108 of the TV 1 nor the external speaker 3 when the TV 1 is not in the state in which the audio is outputted from neither the internal speaker 108 of the TV 1 nor the external speaker 3 as described above. Further, the user may equip the TV 1 and the amplifier 2 with a function which enables an operation for changing the audio output state, i.e. prohibiting the muting operation or canceling the mute state, when the state in which the audio is outputted from neither the internal speaker 108 nor the external speaker 3 of the TV 1 is not assumed.

Functions which enable the muting operation or canceling the mute state can be set when constructing the system shown in FIG. 2. Specifically, when the TV 1 and the amplifier 2 are connected by the HDMI cable or when the power of the TV 1 and the amplifier 2 is turned on after connecting them by the HDMI cable, and so on, the TV 1 may prohibit the muting operation or cancel the off state on its own, and further may prohibit the amplifier 2 connected with the HDMI cable from performing the operations for muting or canceling the mute state held by the amplifier 2. The prohibition may be set by the user by selecting an item in a settings menu or the like held by the TV 1.

Note that with the system according to this embodiment, in the state where the audio is outputted from b oth the internal speaker 108 of the TV 1 and the external speaker 3, or in the state where the audio of both the internal speaker 108 and the external speaker 3 of the TV 1 are muted, the user can obviously recover to the desired audio output state from the state in which the audio is outputted from both the internal speaker 108 of the TV 1 and the external speaker 3, or from the state in which the audio of both the internal speaker 108 and the external speaker 3 of the TV 1 are muted, by displaying the menu screen held by the TV, operating to select "mode change" and thus resetting to the TV mode or the theater mode.

The video/audio output device according to an aspect of the invention is useful as a TV or the like, and the external speaker control apparatus according to an aspect of the invention is useful as an amplifier or the like.

The invention claimed is:

1. A video and audio output apparatus which outputs video and audio, comprising:
    an internal speaker configured to output the audio;
    a holding unit configured to hold information which indicates one of a plurality of audio output modes;
    an accepting unit configured to accept an instruction from outside the video and audio output apparatus;
    a management unit configured to cause the holding unit to hold the information according to a mode-specifying instruction for specifying an output mode of the audio accepted by the accepting unit, the information indicating an output mode of the audio corresponding to the output mode of the audio specified by the mode-specifying instruction;
    a receiving unit configured to receive an instruction from an external speaker control apparatus which controls an external speaker outside of the video and audio output apparatus; and
    an output unit configured to output the information indicating the audio output mode held in the holding unit to the external speaker control apparatus when the receiving unit receives, from the external speaker control apparatus, an instruction requesting output of the information indicating the audio output mode.

2. The video and audio output apparatus according to claim 1,
    wherein the management unit is configured to cause, according to the mode-specifying instruction, the holding unit to hold one of (a) information indicating a first audio output mode for causing the internal speaker to output the audio, and (b) information indicating a second audio output mode for causing the external speaker to output the audio.

3. The video and audio output apparatus according to claim 1, further comprising
    a control unit configured (a) to cause the internal speaker to output the audio when the information indicating the first audio output mode for outputting the audio from the internal speaker is held in the holding unit, and (b) not to output the audio from the internal speaker when the information indicating the second audio output mode for outputting the audio from the external speaker is held in the holding unit.

4. The video and audio output apparatus according to claim 1 further comprising:
    a control unit configured to control the output of the audio from the internal speaker according to the information indicating the audio output mode held in the holding unit; and
    a detection unit configured to detect a change of the power supply of the video and audio output apparatus from an off state to an on state,
    wherein the output unit is further configured to output the information indicating the audio output mode held in the holding unit to an external speaker control apparatus which controls the external speaker when the detection unit detects the change of the power supply from an off state to an on state.

5. An audio output mode notification method comprising:
    holding the information which indicates one of a plurality of audio output modes in a holding unit according to an instruction specifying the audio output mode, the information indicating an output mode of the audio corresponding to the output mode of the audio specified by the mode-specifying instruction;
    receiving an instruction from an external speaker control apparatus which controls a speaker outside a video and audio output apparatus; and
    outputting the information indicating the audio output mode held in the holding unit to the external speaker control apparatus when an instruction requesting the output of the information indicating the audio output mode is received from the external speaker control apparatus.

6. The audio output mode notification method according to claim 5 further comprising:
    controlling the output of the audio from the internal speaker of a video and audio output apparatus, according to the information indicating the audio output mode held in the holding unit;
    detecting a change of the power supply of the video and audio output apparatus from an off state to an on state; and
    outputting the information indicating the audio output mode held in the holding unit to the external speaker control apparatus when the change of the power supply from an off state to an on state is detected.

7. An integrated circuit comprising:
    a management unit configured to cause a holding unit to hold information which indicates one of a plurality of audio output modes, according to an instruction specifying the output mode of the audio, the information indicating an output mode of the audio corresponding to the output mode of the audio specified by the mode-specifying instruction;
    a receiving unit configured to receive an instruction from an external speaker control apparatus which controls a speaker outside a video and audio output apparatus; and
    an output unit configured to output the information indicating the audio output mode held in the holding unit to the external speaker control apparatus when the receiving unit receives, from the external speaker control apparatus, an instruction requesting output of the information indicating the audio output mode.

8. The integrated circuit according to claim 7 further comprising:
    a control unit configured to control the audio outputted from an internal speaker of a video and audio output apparatus, according to the information indicating the audio output mode held in the holding unit; and
    a detection unit configured to detect a change of the power supply of the video and audio output apparatus from an off state to an on state, wherein the output unit is further configured to output the information indicating the audio output mode held in the holding unit to the external speaker control apparatus when the detection unit detects the change of the power supply from an off state to an on state.

9. A non-transitory computer-readable recording medium storing a program, the program causing a computer to execute steps comprising:

causing a holding unit to hold information which indicates one of a plurality of audio output modes, according to an instruction specifying the audio output mode, the information indicating an output mode of the audio corresponding to the output mode of the audio specified by the mode-specifying instruction;

receiving an instruction from an external speaker control apparatus which controls a speaker outside a video and audio output apparatus; and outputting the information indicating the audio output mode held in the holding unit to an external speaker control apparatus in the case where an instruction requesting the output of the information indicating the audio output mode is received from the external speaker control apparatus.

10. The program according to claim 9, wherein the program causes the computer to execute steps further comprising:

controlling output of the audio from an internal speaker of a video and audio output apparatus according to the information indicating the audio output mode held in the holding unit;

detecting a change of the power supply of the video and audio output apparatus from an off state to an on state; and outputting the information indicating the audio output mode held in the holding unit to the external speaker control apparatus when the change of the power supply from an off state to an on state is detected.

* * * * *